US012695198B2

(12) United States Patent
Wang et al.

(10) Patent No.: US 12,695,198 B2
(45) Date of Patent: Jul. 28, 2026

(54) TERAHERTZ TRANSCEIVER INCLUDING TRIPLE-BARRIER RESONANT TUNNELING DIODE

(71) Applicant: National Tsing Hua University, Hsinchu City (TW)

(72) Inventors: Wei-Chih Wang, Sammamish, WA (US); Karthikraj Muthuramalingam, Hsinchu City (TW); Fiona Marie Wang, Seattle, WA (US)

(73) Assignee: NATIONAL TSING HUA UNIVERSITY, Hsinchu City (TW)

(*) Notice: Subject to any disclaimer, the term of this patent is extended or adjusted under 35 U.S.C. 154(b) by 657 days.

(21) Appl. No.: 17/692,163

(22) Filed: Mar. 10, 2022

(65) Prior Publication Data

US 2023/0268654 A1 Aug. 24, 2023

(51) Int. Cl.

*H01Q 9/04* (2006.01)
*H01Q 9/27* (2006.01)

(52) U.S. Cl.

CPC ......... *H01Q 9/0485* (2013.01); *H01Q 9/0414* (2013.01); *H01Q 9/04* (2013.01); *H01Q 9/27* (2013.01)

(58) Field of Classification Search

CPC ...... H01Q 9/0485; H01Q 9/0414; H01Q 9/27; H01Q 9/04; H01Q 1/36; H01Q 1/248

See application file for complete search history.

(56) References Cited

U.S. PATENT DOCUMENTS

| | | | | |
|---|---|---|---|---|
| 6,781,553 B2 * | 8/2004 | Iguchi | H01Q 5/357 343/879 |
| 7,126,151 B2 * | 10/2006 | Estes | H01L 23/48 257/30 |
| 7,710,325 B2 * | 5/2010 | Cheng | H01Q 9/065 343/732 |
| 7,884,764 B2 | 2/2011 | Itsuji | |
| 7,884,767 B2 | 2/2011 | Itsuji | |
| 8,274,058 B1 * | 9/2012 | Wanke | H01Q 1/38 250/370.12 |
| 2010/0026400 A1 | 2/2010 | Koyama et al. | |
| 2011/0155998 A1 * | 6/2011 | Koyama | B82Y 10/00 257/13 |

(Continued)

FOREIGN PATENT DOCUMENTS

| | | | |
|---|---|---|---|
| CN | 106057915 B * | 4/2019 | H01L 29/452 |
| CN | 110085682 A * | 8/2019 | H01L 29/66151 |

(Continued)

OTHER PUBLICATIONS

International Search Report and Written Opinion issued in PCT/US2022/017532, dated Nov. 11, 2022.

(Continued)

*Primary Examiner* — Ida M Soward

(74) *Attorney, Agent, or Firm* — HSML P.C.

(57) ABSTRACT

The present disclosure provides a terahertz (THz) transceiver including a triple-barrier resonant tunneling diode (TBRTD), a resonator antenna electrically connected to an emitter and a collector of the TBRTD, and a radiator antenna disposed over the resonator antenna and vertically aligned with the resonator antenna for reducing a system size. A corresponding method of fabricating the THz transceiver is also provided.

20 Claims, 19 Drawing Sheets

(56) References Cited

U.S. PATENT DOCUMENTS

| | | | | |
|---|---|---|---|---|
| 2016/0178843 | A1* | 6/2016 | Fujita | H01Q 1/00 385/14 |
| 2018/0066981 | A1* | 3/2018 | Mukai | G01J 5/045 |
| 2021/0328550 | A1* | 10/2021 | Asada | H01Q 23/00 |
| 2023/0284925 | A1* | 9/2023 | Wang | H01Q 1/248 |

FOREIGN PATENT DOCUMENTS

| | | | | | |
|---|---|---|---|---|---|
| CN | 111785786 | A | * | 10/2020 | H01L 21/0254 |
| CN | 113097312 | A | * | 7/2021 | H01L 29/0607 |
| CN | 113193037 | A | * | 7/2021 | H01L 29/0615 |
| JP | 2007295635 | A | | 11/2007 | |
| JP | 2009152547 | A | | 7/2009 | |
| JP | 2011114120 | A | * | 6/2011 | H01L 29/88 |
| JP | 2012216714 | A | * | 11/2012 | H01Q 13/10 |
| JP | 2013050360 | A | | 3/2013 | |
| JP | 2013236326 | A | | 11/2013 | |
| JP | 2017157907 | A | | 9/2017 | |
| WO | WO-2022019136 | A1 | * | 1/2022 | H03B 7/08 |

OTHER PUBLICATIONS

Asada et al., "Terahertz Emitter Using Resonant-Tunneling Diode and Applications", sensors, Published Feb. 16, 2021, 19 pages.

Arzi et al., "Triple-Barrier Resonant-Tunnelling Diode THz Detectors with on-chip antenna", 2019 12th German Microwave Conference (GeMiC), Date Added to IEEE Xplore Apr. 25, 2019.

Office Action issued in corresponding Japanese patent application No. 2024-549719, mailed Sep. 16, 2025, with machine translation.

Office Action issued in corresponding European patent application No. 22929134.9, mailed Oct. 15, 2025.

Masahiro Asada, "Photon-Assisted Tunnel in Resonance Tunneling Structures and Terahertz Devices", Applied Physics, vol. 74, No. 5, 2005, pp. 587-592, with English Abstract.

Suzuki et al., "Terahertz oscillators and receivers using electron devices for high-capacity wireless communication", vol. 9483, May 13, 2015 (May 13, 2015), pp. 948309-948309, XP060052916.

Kasgi et al., "Large-scale array of resonant-tunneling-diode terahertz oscillators for high output power at 1 THz", Journal of Applied Physics, American Institute of Physics, 2 Huntington Quadrangle, Melville, NY 11747, vol. 125, No. 15, Mar. 28, XP012236601, Mar. 28, 2019.

* cited by examiner

TERAHERTZ TRANSCEIVER INCLUDING TRIPLE-BARRIER RESONANT TUNNELING DIODE

BACKGROUND

1. Technical Field

The present disclosure relates to a transceiver technology. In particular, the present disclosure further relates to a terahertz (THz) transceiver and a method of fabricating the THz transceiver.

2. Description of Related Art

Non-destructive testing (NDT) is a method to examine the structural and molecular properties of a system without causing damage to it. The NDT method is widely used in mechanical engineering, civil engineering, material science, medical field, etc. In any small testing system, the NDT is just straightforward, and a very small amount of sensing data is transferred to the examining station through the wired or wireless network. However, non-destructive testing of large structures, such as coal mines, long-distance pipelines, wind-turbine blades, railroads, etc., are not only extremely challenging but also requires sensors fusion of different non-destructive techniques.

Recently, the automated NDT integrated with sensors fusion technology is popular in many industries due to its advantage of testing large structures from the remote station. Industries already started deploying Artificial Intelligence (AI), Internet-of-Things (IoT), and cloud computing to perform the automated NDT with the sensors fusion. The bottleneck of performing the automated NDT from the remote station is that the wireless network bandwidth limits the numbers of sensors connected in a fusion network wirelessly.

The future is going to be wireless and the wireless bandwidth and data transfer speed are the key aspects to create ultra-big sensors fusion network for the automated NDT from the remote station. Recent developments such as IoT, AI, cloud computing, virtual reality (VR), augmented reality (AR), and autonomous vehicles are known for transferring a large amount of data quickly. Further, in wirelessly connected sensors/systems field, the performance is primarily dependent on the wireless speed. Frankly speaking, the wireless speed in a short-range wireless network is the vital component for the advancements in the automated NDT and the sensors fusion in the future wireless world.

In view of above, terahertz (THz) electromagnetic waves are suitable for carrying hundreds of gigabytes of data per second and the terahertz beam is directional. THz rays are less ionized and non-invasive. Further, THz rays can penetrate many dielectric materials, and many chemical finger-prints such as explosives are in the terahertz spectrum, which extends the applications of terahertz waves from communication to non-destructive analysis of solids.

SUMMARY

The present disclosure provides a terahertz (THz) transceiver including a triple-barrier resonant tunneling diode (TBRTD) with an emitter layer and a collector layer, a resonator antenna electrically connected to the emitter layer and the collector layer of the TBRTD, and a radiator antenna disposed over the resonator antenna and vertically aligned with the resonator antenna.

The present disclosure further provides a method of fabricating a THz transceiver, including: forming a TBRTD with an emitter layer and a collector layer, forming a resonator antenna electrically connected to the emitter layer and the collector layer of the TBRTD, and forming a radiator antenna disposed over the resonator antenna and vertically aligned with the resonator antenna.

The present disclosure provides a THz transceiver and a method of fabricating the THz transceiver to overcome the challenges associated with the development of compact, efficient, and low-cost terahertz transceivers for short-range high-speed communication and non-destructive analysis using portable terahertz scanners. The THz transceiver in the present disclosure can be produced using matured planar integrated circuit (IC) fabrication processes so that the size shrinks to the micrometer scale, which permits IC-level packaging of the transceiver. Also, the THz transceiver in the present disclosure does not require silicon (Si) lens used for THz extraction in conventional transceiver devices. The electronically reconfigurable frequency-tuning antenna in the provided THz transceiver not only helps to extract the terahertz radiation into free-space but also is capable of tuning the output frequency in the portable terahertz scanner for the NDT. Further, the THz transceiver in the present disclosure can be installed with IoT devices, sensors fusion networks, AR and VR devices to support the high-speed data transfer in the automated non-destructive testing applications.

Some of the advantages of the THz transceiver provided by the present disclosure are listed below.

Reduced system size: A small compact TBRTD combined with a reconfigurable fractal radiator antenna with a ferro-electric substrate allows a very small overall transceiver footprint (approximately smaller than 1×1 mm with antenna) for the 0.2 to 0.6 THz operation.

Tunable frequency and wide band operation: The provided THz transceiver utilizes a broadband TBRTD and a reconfigurable radiator antenna allowing very high Q (>100) narrow band continuous tuning and wide band (0.2 to 0.6 THz) operation.

Batch process and price reduction: One way to drive down the price is by making the device simpler and easier to fabricate and also utilizing batch process and making the device compatible aside from all the technical issues that need to be addressed. The provided THz transceiver meets perfectly the necessary market requirement, providing a simpler, more cost effective and compatible device that can be easily adopted to different specifications and standards.

Applications and Advances: The provided THz-transceiver overcomes the existing limitations in cost and portability, and allows applications such as portable THz scanner for biomedical imaging and portable THz spectrometer for the non-destructive analysis for industrial and biomedical applications. Moreover, the terahertz spectrum contains chemical finger-prints of many toxic and explosives. Accordingly, the provided THz transceiver is useful in many fields, such as security and screening applications in airports, to perform the non-destructive analysis of explosives.

BRIEF DESCRIPTION OF THE DRAWINGS

The present disclosure can be more fully understood by reading the following descriptions of the embodiments, with reference made to the accompanying drawings.

DETAILED DESCRIPTION OF THE EMBODIMENTS

The following detailed description is used for illustrating the present disclosure. A person skilled in the art can easily conceive the other advantages and effects of the present disclosure, based on the disclosure of the specification. The present disclosure can also be implemented or applied as described in different embodiments. It is possible to modify or alter the following description for carrying out this disclosure without contravening its spirit and scope, for different aspects and applications.

Figure 1:
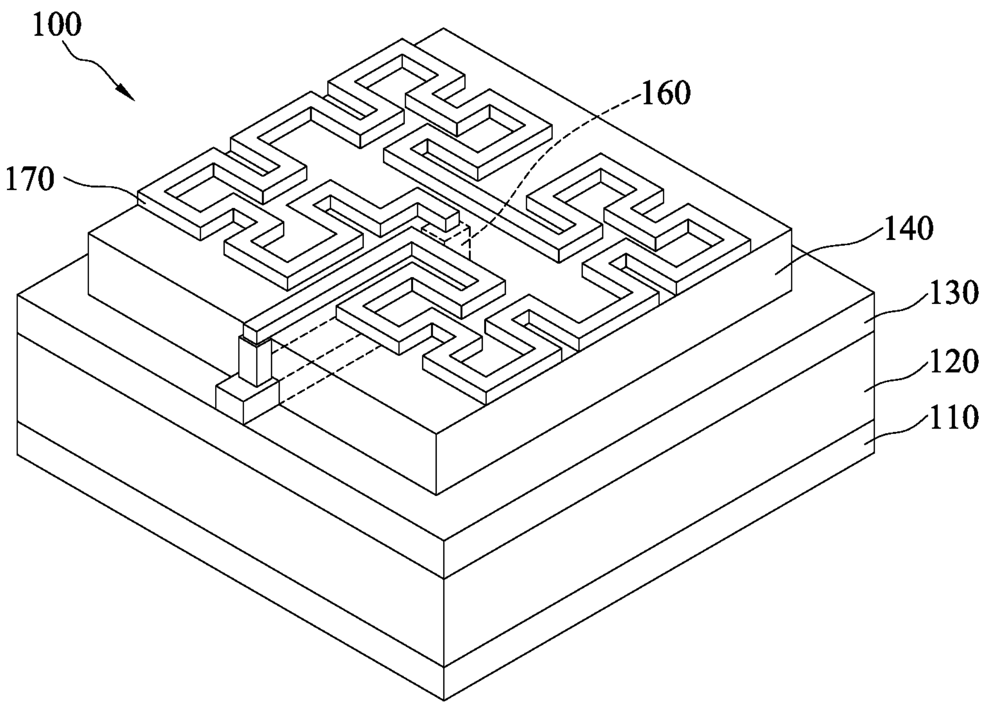
FIG. 1 and FIG. 2 are perspective views of a THz transceiver according to an embodiment of the present disclosure.
Figure 2:
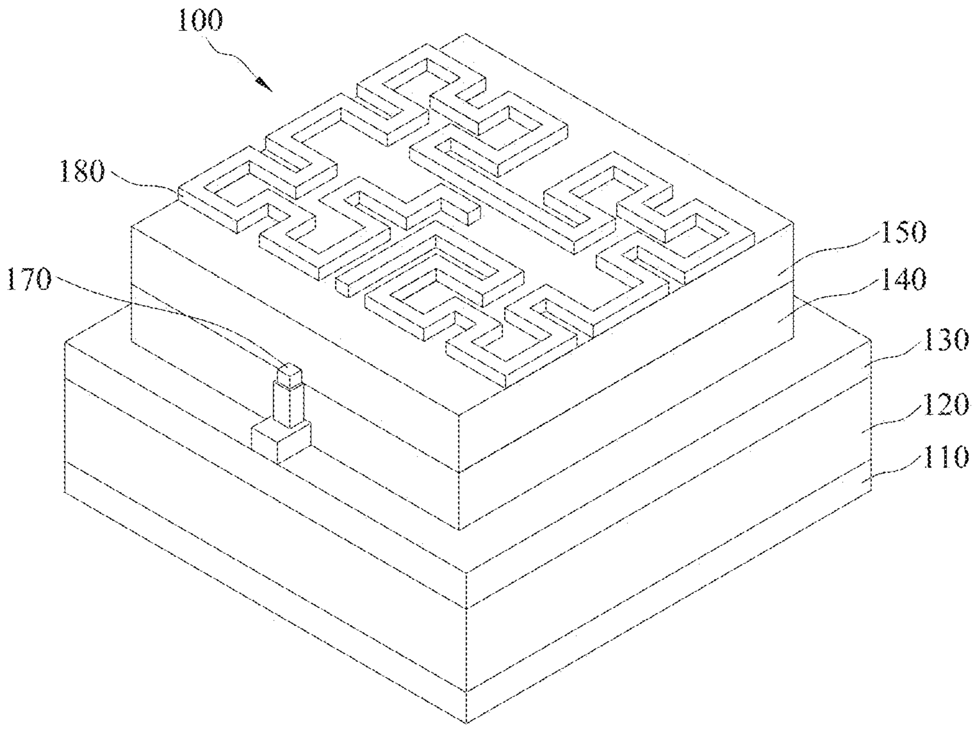

FIG. 1 and FIG. 2 are perspective views of a THz transceiver 100 according to an embodiment of the present disclosure. The THz transceiver 100 includes a grating reflector 110, a substrate 120, a buffer layer 130, a passivation layer 140, a spacer layer 150, a TBRTD 160, a resonator antenna 170, and a radiator antenna 180. The radiator antenna 180 and the spacer layer 150 are removed in FIG. 1 to show the resonator antenna 170 more clearly. The substrate 120 is disposed on the grating reflector 110. The buffer layer 130 is disposed on the substrate 120. The passivation layer 140 is disposed on the buffer layer 130. The TBRTD 160 is embedded in the passivation layer 140. The main section of the resonator antenna 170 is disposed on the passivation layer 140. A top electrode of the resonator antenna 170 is electrically connected to the emitter end of the TBRTD 160, while a bottom electrode of the resonator antenna 170 is electrically connected to the collector end of the TBRTD 160. The top electrode of the resonator antenna 170 is embedded in the passivation layer 140, while the bottom electrode of the resonator antenna 170 is disposed on the buffer layer 130 and is embedded in or covered by the passivation layer 140. The spacer layer 150 is disposed on the passivation layer 140 and the resonator antenna 170. The radiator antenna 180 is disposed on the spacer layer 150.

In the embodiment, the resonator antenna 170 and the radiator antenna 180 are fractal antennas shaped according to the same fractal curve or fractal pattern. Therefore, the radiator antenna 180 has the same shape and the same size as those of the main section of the resonator antenna 170. In addition, the radiator antenna 180 and the main section of the resonator antenna 170 are aligned vertically. For example, the resonator antenna 170 and the radiator antenna 180 shown in FIG. 1 and FIG. 2 are both shaped according to the Hilbert curve. In another embodiment, the resonator antenna 170 and the radiator antenna 180 may be shaped according to another fractal curve or fractal pattern, such as the Koch curve, the Peano curve, the Sierpinski gasket or the Minkowski geometry.

In the embodiment, the grating reflector 110 is made of metal and dielectric. The substrate 120 is made of indium phosphide (InP). The buffer layer 130 is made of $In_{0.53}Ga_{0.47}As$. Further, the passivation layer 140 is made of silicon dioxide ($SiO_2$). The purpose of the passivation layer 140 is to protect the non-exposed parts of the THz transceiver 100 during the etching of the fabrication process. Therefore, the material of the passivation layer 140 may vary based on the etchant. The spacer layer 150 acts as the separation between the resonator antenna 170 and the radiator antenna 180. The spacer layer 150 should be transparent in the terahertz region. Therefore, the spacer layer 150 is preferred to be made of polymer, such as cyclic olefin copolymer (COC) or benzocyclobutene (BCB). The resonator antenna 170 and the radiator antenna 180 may be made of any electrical conductor, such as metal.

In case of transmitter operation, the quantum mechanical resonant tunneling in the TBRTD 160 is a fast process that causes THz transient current within the TBRTD 160. The inductance of the resonator antenna 170 compensates the parasitic capacitance of TBRTD 160 and thus creates resonance for THz oscillation based on the THz transient current. The generated THz electromagnetic wave from the resonator antenna 170 inductively couples with the radiator antenna 180 and is emitted into the free space by the radiator antenna 180.

In case of receiver operation, the radiator antenna 180 works as the receiving antenna which absorbs the THz signal incident on it. The localized electromagnetic field of the THz signal at the radiator/receiver antenna 180 inductively couples with the resonator antenna 170. The electromagnetic field at the resonator antenna 170 causes the THz current flow through the TBRTD 160 due to electrical rectification.

The THz transceiver 100 adopts the TBRTD 160 as the terahertz source because resonant tunneling diode (RTD) is the only electronic terahertz source that has the highest oscillation frequency at room temperature, and triple-barrier RTD (TBRTD) provides higher direct current (DC) to radio frequency (RF) conversion efficiency than conventional double-barrier RTD (DBRTD) does due to lower peak voltage and higher peak current.

Conventional RTD THz transceivers use narrow band antennas such as slot and patch antennas which are extremely narrowband, and the output spectrum of these devices are not tunable. In contrast, the THz transceiver 100 provided by the present disclosure uses high-gain, omnidirectional, broadband fractal antennas, and the output spectrum of the THz transceiver 100 is tunable. The fractal antennas, namely the resonator antenna 170 and the radiator antenna 180, of the THz transceiver 100 are capable of emitting and receiving THz radiation from 200 GHz to 600 GHz.

In addition, in the conventional RTD THz transceiver, 98% of the generated THz power is trapped within the substrate due to the total internal reflection (TIR) within the substrate caused by the high refractive index of the substrate, thus the generated power is wasted and converted into undesirable heat. Therefore, the conventional RTD THz transceiver uses a silicon lens at the back side (the side facing away from the RTD) of the substrate to extract as much power as possible. However, the adhesion glue layer between the substrate and the silicon lens causes high loss of the extracted power. The silicon lens requires precise alignment, and the silicon lens is bulky and expensive.

Figure 4:
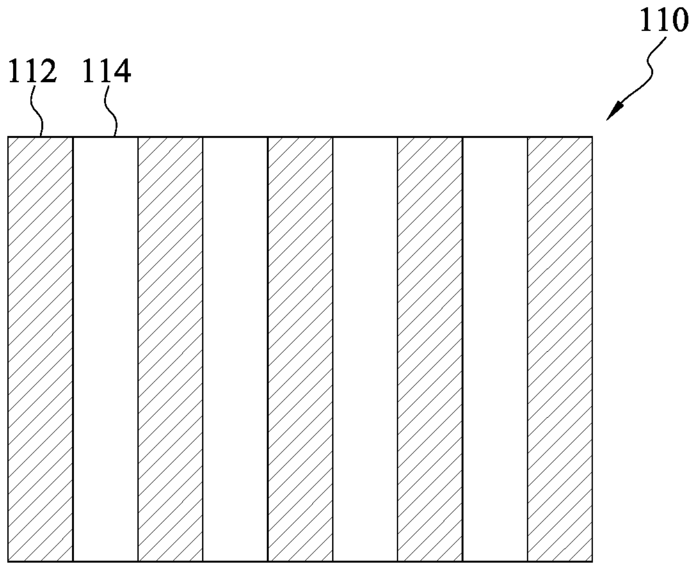
FIG. 4 is a top view of a grating reflector of a THz transceiver according to an embodiment of the present disclosure.

In contrast, the grating reflector 110 used at the back side of the substrate 120 of the THz transceiver 100 not only eliminates the use of silicon lens but also reduces the TIR effect within the substrate 120 so as to improve the DC-RF conversion efficiency. As shown in FIG. 4, which is a top view of the grating reflector 110 according to an embodiment of the present disclosure, the grating reflector 110 is formed by alternately interleaved metal strips 112 and dielectric strips 114. The combined width of each adjacent pair of a metal strip 112 and a dielectric strip 114 is much smaller than the wavelength of the THz electromagnetic wave generated from the resonator antenna 170. In this configuration, the interleaved metal strips 112 and dielectric strips 114 periodically change the refractive index at the interface between the substrate 120 and the grating reflector 110, thus reducing the TIR within the substrate 120 and reflecting the emitted power to the front side (the side facing toward the TBRTD 160) of the substrate 120. Therefore, the grating reflector 110 improves the THz radiation at the front side of the substrate 120. Further, the metal strips 112 of the grating reflector 110 act as a heat sink so as to disperse the heat generated within the substrate 120.

The grating reflector 110 is not limited to the structure shown in FIG. 4. For example, in another embodiment, the grating reflector 110 may be formed by two-dimensionally alternately interleaved metal patches and dielectric patches based on a checkerboard pattern. In this case, the combined width of each adjacent pair of a metal patch and a dielectric patch measured along any one of the two dimensions is much smaller than the wavelength of the THz electromagnetic wave generated from the resonator antenna 170.

Figure 3:
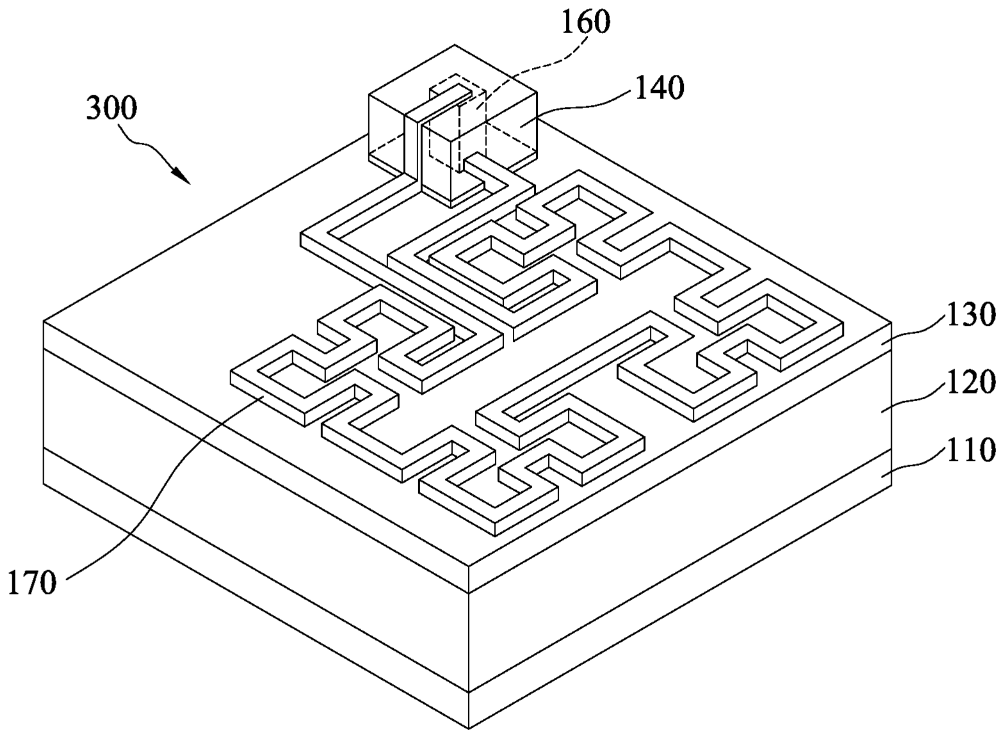
FIG. 3 is a perspective view of a THz transceiver according to another embodiment of the present disclosure.

FIG. 3 is a perspective view of a THz transceiver 300 according to an embodiment of the present disclosure, which is an alternate design of the aforementioned THz transceiver 100. The main section of the resonator antenna 170 of the THz transceiver 300 is fabricated on the substrate 120 or the buffer layer 130. In FIG. 3, the spacer layer 150 and the radiator antenna 180 are removed and only a small part of the passivation layer 140 is shown, so as to show the TBRTD 160 and the resonator antenna 170 more clearly. In fact, the passivation layer 140 of the THz transceiver 300 may have approximately the same size as its counterpart in FIG. 1 such that the passivation layer 140 covers the resonator antenna 170, and the THz transceiver 300 includes a spacer layer 150 disposed on the passivation layer 140 and a radiator antenna 180 fabricated on the spacer layer 150.

Figure 5:
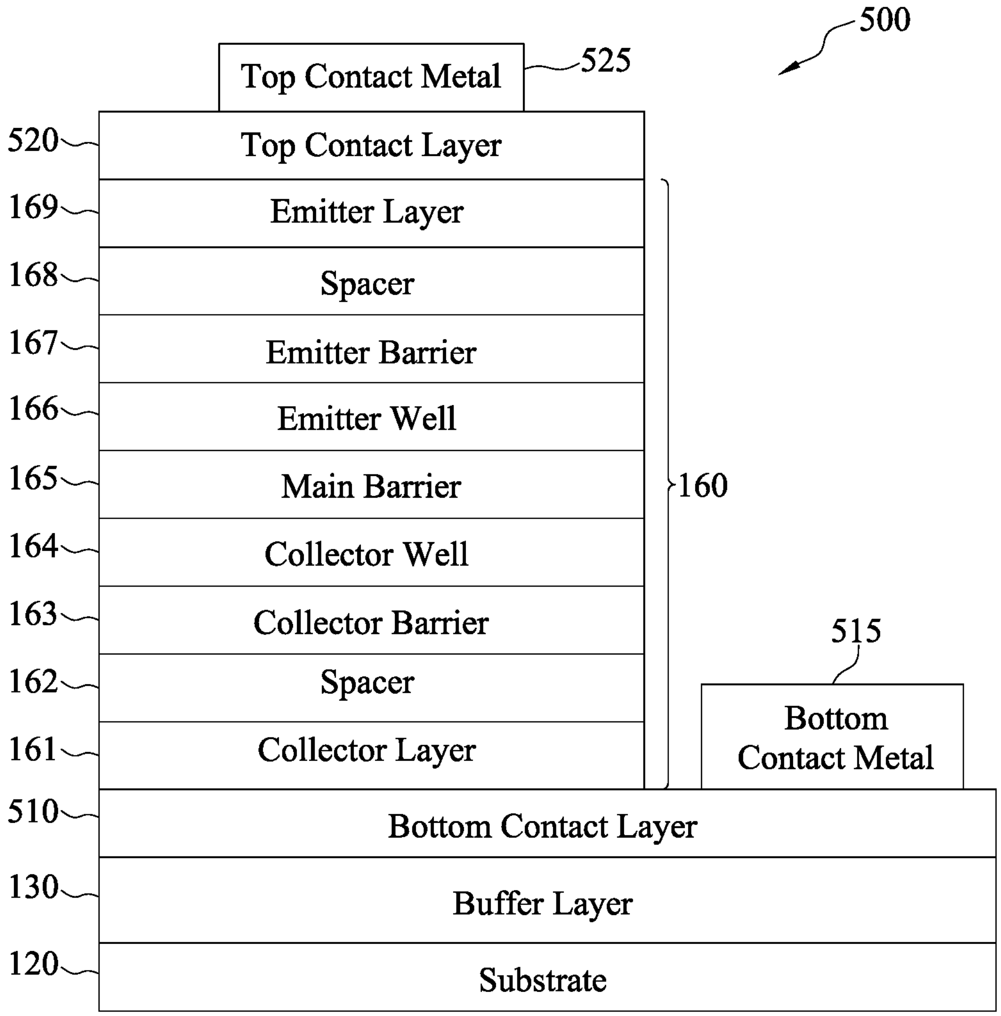
FIG. 5 is a cross-sectional view of a part of a THz transceiver according to an embodiment of the present disclosure.

FIG. 5 is a cross-sectional view of a part of a THz transceiver 500 according to an embodiment of the present disclosure. The THz transceiver 500 includes all of the components and the layers of the THz transceiver 100 shown in FIG. 1 and FIG. 2. In addition, the THz transceiver 500 further includes a bottom contact layer 510 disposed between the buffer layer 130 and the TBRTD 160, a top contact layer 520 formed on TBRTD 160, a bottom contact metal 515 formed on the bottom contact layer 510, and a top contact metal 525 formed on the top contact layer 520. The bottom contact metal 515 and the top contact metal 525 are formed by sputtering gold and are terminal parts of the resonator antenna 170.

As shown in FIG. 5, the TBRTD 160 includes 9 stacked layers, which are, from bottom to top, a collector layer 161, a spacer 162, a collector barrier 163, a quantum well (collector well) 164, a main barrier 165, another quantum well (emitter well) 166, an emitter barrier 167, a spacer 168, and an emitter layer 169. The following Table 1 lists the material, thickness and Molar concentration of silicon doping of each layer from the top contact layer 520 to the buffer layer 130 in FIG. 5.

TABLE 1

| Numeral | Layer | Material | Thickness (nm) | Doping ($cm^{-3}$) |
|---|---|---|---|---|
| 520 | top contact layer | $In_{0.53}Ga_{0.47}As$ | 50 | $3 \times 10^{19}$ |
| 169 | emitter layer | $In_{0.53}Ga_{0.47}As$ | 50 | $2 \times 10^{18}$ |
| 168 | spacer | $In_{0.53}Ga_{0.47}As$ | 5 | 0 |
| 167 | emitter barrier | AlAs | 1.2 | 0 |
| 166 | emitter well | $In_{0.53}Ga_{0.47}As$ | 6.5 | 0 |
| 165 | main barrier | $In_{0.52}Al_{0.48}As$ | 2.4 | 0 |
| 164 | collector well | $In_{0.53}Ga_{0.47}As$ | 4.5 | 0 |
| 163 | collector barrier | AlAs | 1.2 | 0 |
| 162 | spacer | $In_{0.53}Ga_{0.47}As$ | 5 | 0 |
| 161 | collector layer | $In_{0.53}Ga_{0.47}As$ | 50 | $2 \times 10^{18}$ |
| 510 | bottom contact layer | $In_{0.53}Ga_{0.47}As$ | 400 | $3 \times 10^{19}$ |
| 130 | buffer layer | $In_{0.53}Ga_{0.47}As$ | 3000 | $1 \times 10^{16}$ |

In a traditional double-barrier RTD or DBRTD, the emitter and collector barriers are identical (identical barrier material and thickness) and the device structure is symmetrical to avoid quick thermal leakage current and to increase the tunneling current.

In contrast, the triple barriers of the TBRTD 160 proposed by the present disclosure includes more quantum wells and barriers, which increases well charge and peak current, and lowers peak voltage. Moreover, the TBRTD 160 includes a non-identical main barrier 165. As listed in Table 1, while the collector barrier 163 and the emitter barrier 167 have identical material and thickness, the main barrier 165 is formed by a different material and the thickness of the main barrier 165 is also different. Further, the collector well 164 and the emitter well 166 are also asymmetrical because of their different thicknesses. Therefore, the aforementioned asymmetrical structure enhances the tunneling current and increase the maximum operating frequency limit.

As shown in Table 1, the main barrier 165 is made of $In_{0.52}Al_{0.48}As$. The collector barrier 163 and the emitter barrier 167 are made of AlAs. The other layers listed in Table 1 are all made of $In_{0.53}Ga_{0.47}As$. The TBRTD 160 adopts the InGaAs/InAlAs/AlAs material combination because this material system offers better RTD properties. The spacers 162 and 168 are undoped-$In_{0.53}Ga_{0.47}As$ to avoid the diffusion of charge carriers from the highly doped layers. The TBRTD 160 shows a simulated peak current density of 440 $kA/cm^2$ and a DC-RF conversion efficiency up to 19.75%. Theoretically calculated maximum extractable output power of the TBRTD 160 is about 250 μW at 0.95 THz for a device area of 1 $\mu m^2$, which is much higher than the previously reported output power of a traditional TBRTD. The non-identical triple barrier structure of the TBRTD 160 exhibits $\Delta V$ of 0.41 V and $\Delta I$ of 0.0033 A, wherein $\Delta V$ and $\Delta I$ are respectively the voltage and the current of the negative differential resistance (NDR) region of the TBRTD 160. The peak-to-valley current ratio (PVCR) is about 4.71. Compared to a traditional TBRTD, the peak current and the peak voltage of the TBRTD 160 are lowered without compromising the PVCR, which simultaneously increases the DC-RF conversion efficiency as well. The maximum oscillation frequency of the TBRTD 160 is 0.95 THz. The theoretically estimated parasitic capacitance of the TBRTD 160 is $c_n$=21.3 fF. The series resistance of the TBRTD 160 is $R_s$=3.25Ω. The reciprocal of the negative conductance of the TBRTD 160 is $R_n$=18.66Ω.

Figure 6:
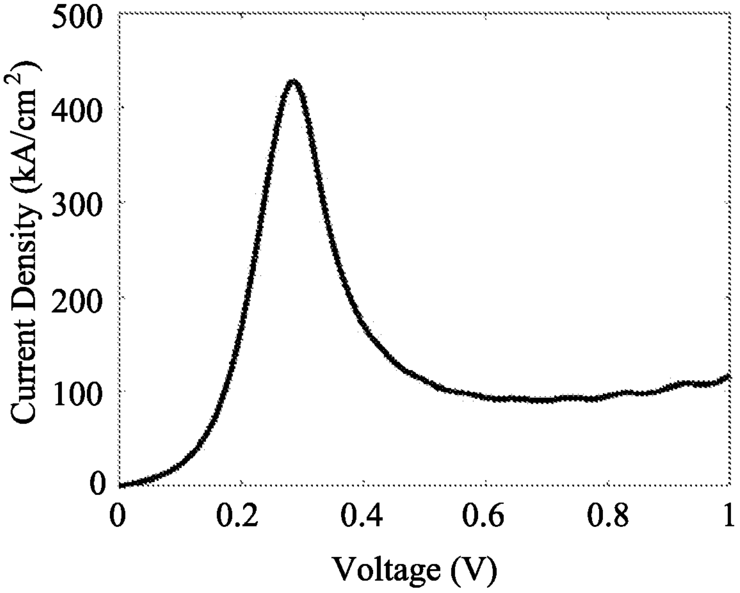
FIG. 6 is an exemplary graph showing the voltage versus current density characteristic of a TBRTD according to an embodiment of the present disclosure.
Figure 7:
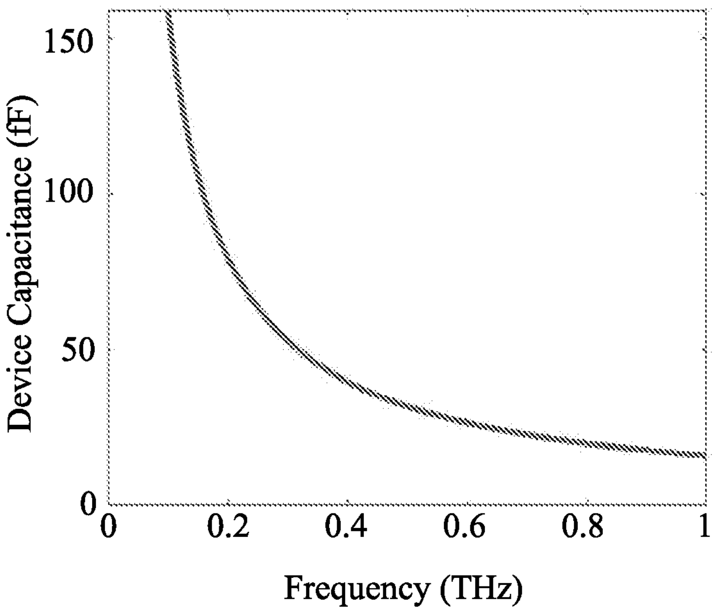
FIG. 7 is an exemplary graph showing the estimated device capacitance versus maximum oscillation frequency characteristic of a TBRTD according to an embodiment of the present disclosure.

FIG. 6 is an exemplary graph showing the numerically simulated voltage versus current density characteristic of the TBRTD 160 with a device area of 1 $\mu m^2$. FIG. 7 is an exemplary graph showing the estimated device capacitance versus maximum oscillation frequency characteristic of the TBRTD 160 with a device area of 1 $\mu m^2$.

In the embodiment, the resonator antenna 170 and the radiator antenna 180 of the THz transceiver 500 are fractal antennas because fractal technology allows miniature antennas and integration of multiple bands. Fractal antennas have desirable properties such as space filling, self-similarity, fractional dimensions, infinite complexity, mechanical simplicity and robustness, which make fractal antennas unique to attain advantages like miniaturization, wideband and multiband characteristics with better efficiency. The space filling property is used to reduce antenna size. The self-similarity is used to achieve multiband resonator antenna. The number of iterations of the geometries of the resonator antenna 170 and the radiator antenna 180 are based on their operating wavelengths.

Further, the radiator antenna 180 of the THz transceiver 500 is a reconfigurable fractal antenna so as to expand its operational frequency range. The radiator antenna 180 can be adjusted to achieve either re-configurability or tunability in the desired frequency range for wireless communications.

Figure 8:
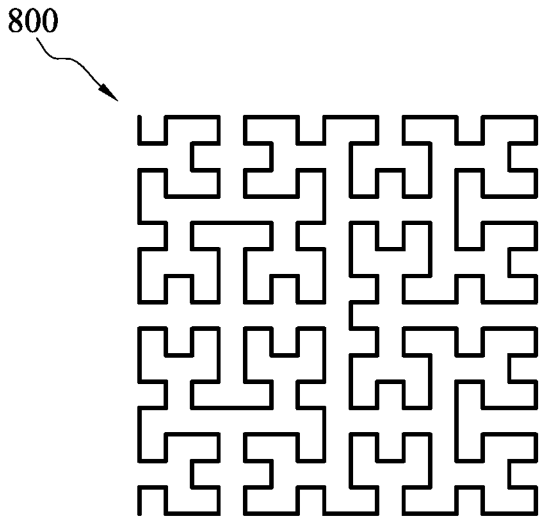
FIGS. 8-11 are schematic diagrams showing frequency-tunable fractal antennas of THz transceivers according to different embodiments of the present disclosure.
Figure 9:
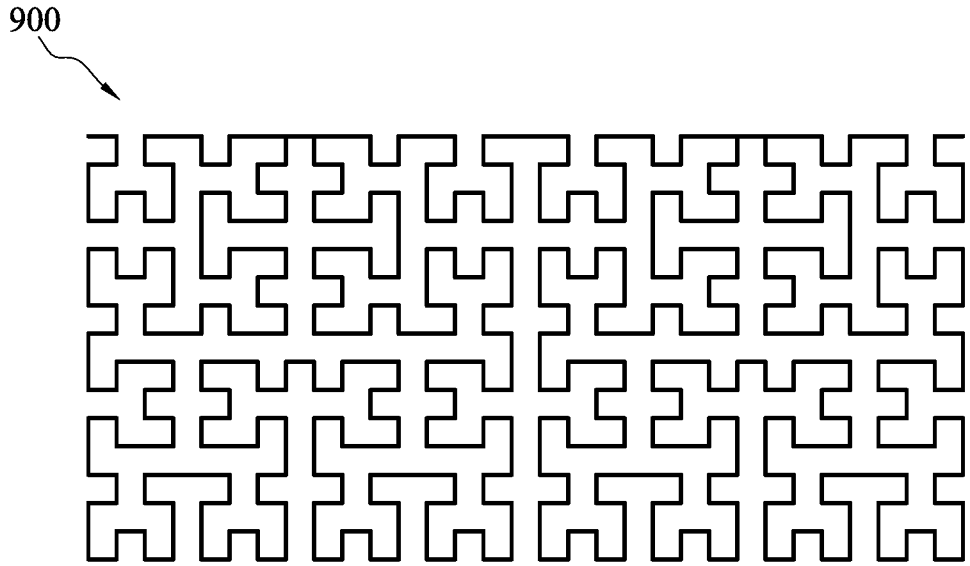
Figure 12:
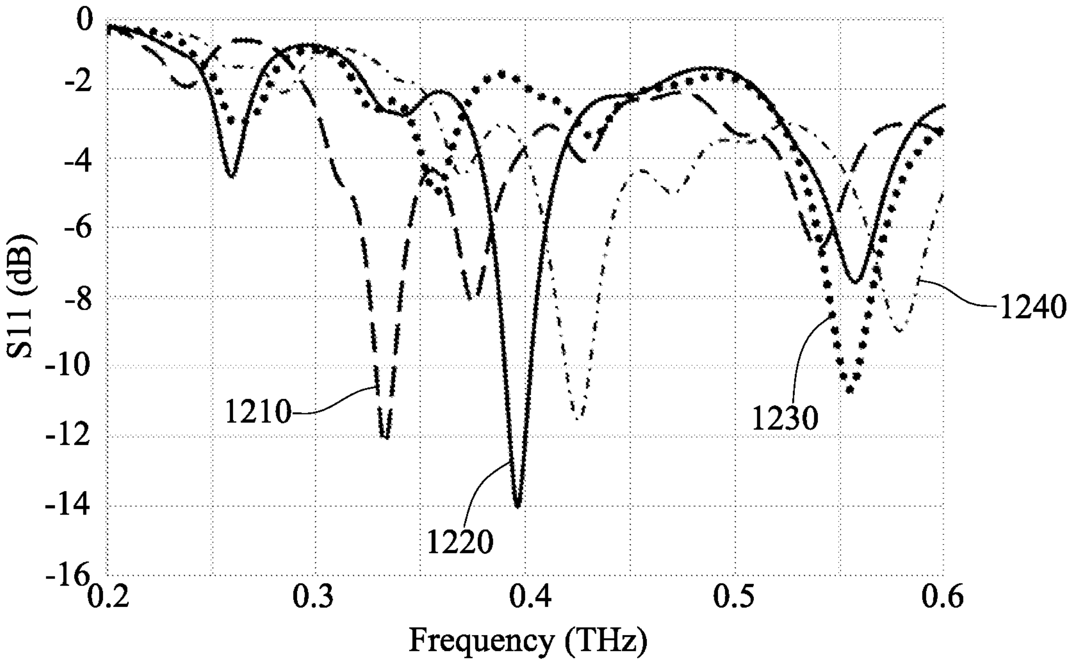
FIGS. 12 and 13 are exemplary graphs showing frequency shifts of frequency-tunable fractal antennas of THz transceivers according to different embodiments of the present disclosure.

In an embodiment, for a large frequency shift, a large section of electrical length or a large segment of fractal patterns can be simply disconnected from the radiator antenna 180, hence reducing the overall size of the radiator antenna 180 and generating an upward frequency shift. On the other hand, more electrical length or more fractal patterns can be connected to the radiator antenna 180, hence increasing the overall size of the radiator antenna 180 and generating a downward frequency shift. The radiator antenna 180 may include at least one switch embedded in the fractal curve or the fractal pattern of the radiator antenna 180. The at least one switch may be implemented by diode or transistor for connecting and disconnecting one or more sections or segments of the radiator antenna 180 to reconfigure the radiator antenna 180 for frequency shifts. For example, in an embodiment, the radiator antenna 180 may be switched between the one-segment fractal curve 800 in FIG. 8 and the two-segment fractal curve 900 in FIG. 9. When the radiator antenna 180 is switched to the one-segment fractal curve 800 in FIG. 8, its reflection coefficient S11 is plotted as the curve 1210 in FIG. 12. When the radiator antenna 180 is switched to the two-segment fractal curve 900 in FIG. 9, its reflection coefficient S11 is plotted as the curve 1220 in FIG. 12.

Figure 10:
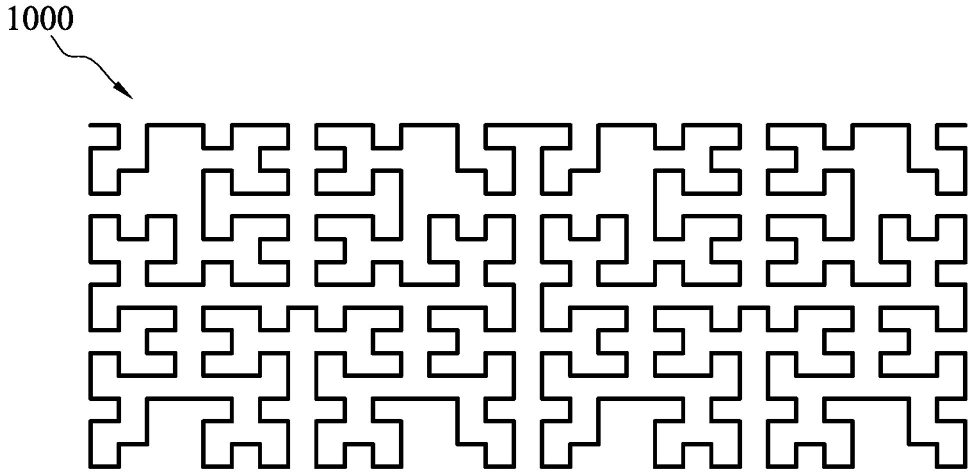
Figure 11:
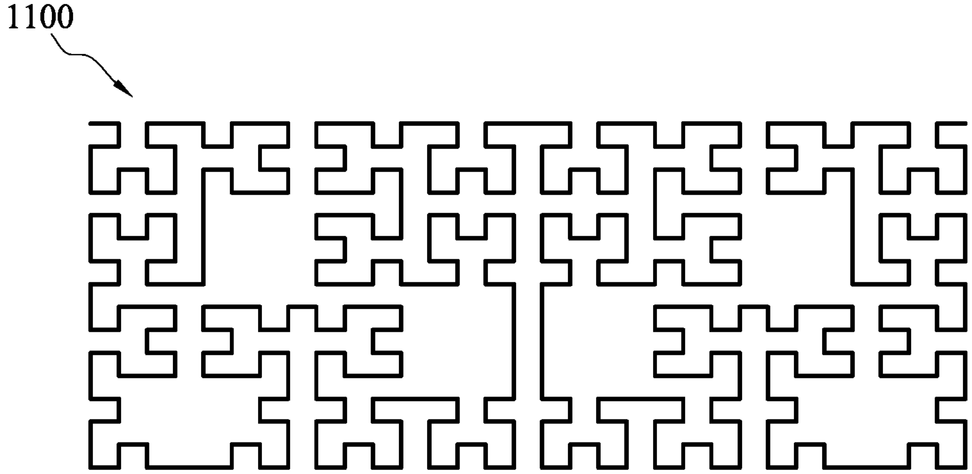

In an embodiment, for a medium frequency shift, fewer fractal patterns or less electrical length can be disconnected from or connected to the radiator antenna 180 by controlling the switches embedded in the radiator antenna 180. The effect can either decrease the electrical length of the radiator antenna 180, which increases the operating frequency, or vice versa. For example, in an embodiment, the radiator antenna 180 may be further switched between the fractal curve 1000 in FIG. 10 and the fractal curve 1100 in FIG. 11. When the radiator antenna 180 is switched from the fractal curve 900 in FIG. 9 to the fractal curve 1000 in FIG. 10, three arms are cut from each fractal segment, which increases electrical length. The resultant reflection coefficient S11 is plotted as the curve 1230 in FIG. 12. An approximately 0.02 THz downward (leftward) frequency shift is observed. When the radiator antenna 180 is switched to the fractal curve 1100 in FIG. 11 with larger cut and electrical length reduction, the reflection coefficient S11 is plotted as the curve 1240 in FIG. 12. Here, upward (rightward) frequency shift is observed.

In another embodiment, similar to the radiator antenna 180, the resonator antenna 170 may include at least one switch implemented by diode or transistor for connecting and disconnecting one or more sections, segments or arms of the resonator antenna 170 to reconfigure the resonator antenna 170 for large and medium frequency shifts.

In another embodiment, both of the resonator antenna 170 and the radiator antenna 180 include switches for large and medium frequency shifts.

In an embodiment, for a fine frequency shift or continuous frequency tuning, the spacer layer 150 underneath the radiator antenna 180 includes a ferroelectric material, such as polymer dispersed liquid crystal (PDLC), whose permittivity changes when the electric field applied to the ferroelectric material changes. Different from the aforementioned reconfiguration of fractal pattern where frequency shift is more discrete and highly dependent on the fractal pattern, the voltage induced dielectric constant change in the radiator antenna 180 can create much more continuous and infinitesimal change of operating frequency.

Figure 13:
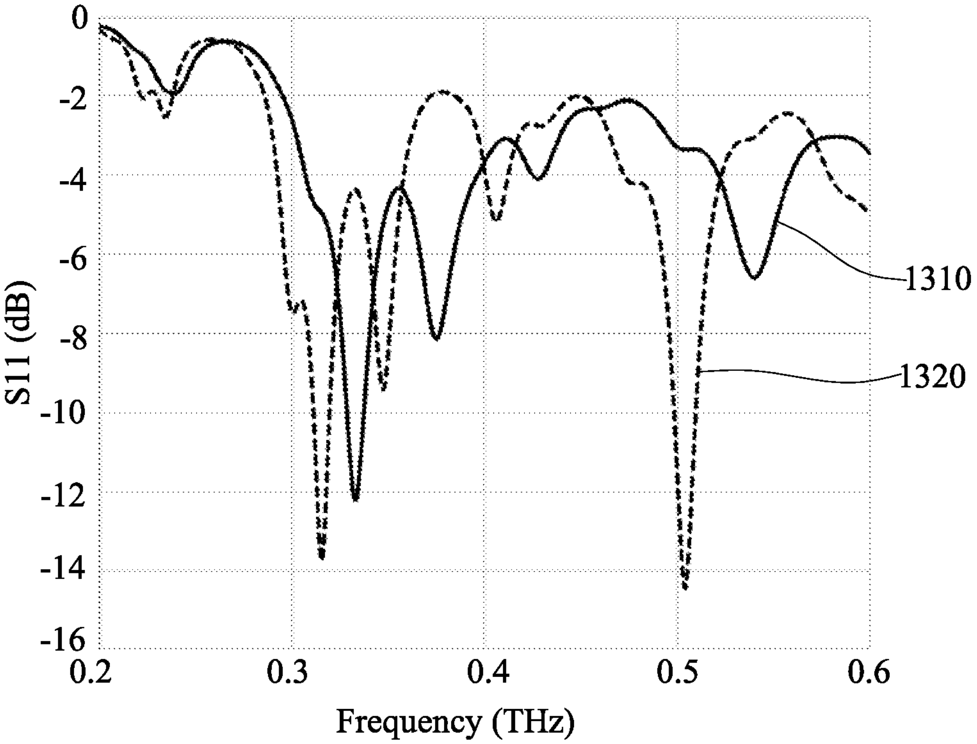

An example of this frequency shift due to permittivity change using a spacer layer 150 consisting of PDLC on the radiator antenna 180 is shown in FIG. 13, wherein frequency shifts are due to the liquid crystals in the spacer layer 150 changing from an ordinary polarization state (corresponding to the curve 1310) to an extraordinary polarization state (corresponding to the curve 1320). The operating frequency of the radiator antenna 180 changes proportionally with the permittivity of the PDLC in the spacer layer 150.

In another embodiment, the substrate 120, the buffer layer 130 or the passivation layer 140 underneath the resonator antenna 170 includes a ferroelectric material such as PDLC for a fine frequency shift or continuous frequency tuning of the resonator antenna 170.

In another embodiment, the substrate 120, the buffer layer 130 or the passivation layer 140 underneath the resonator antenna 170 and the spacer layer 150 underneath the radiator antenna 180 both include ferroelectric materials such as PDLC for fine frequency shifts or continuous frequency tuning of the resonator antenna 170 and the radiator antenna 180.

Figure 14A:
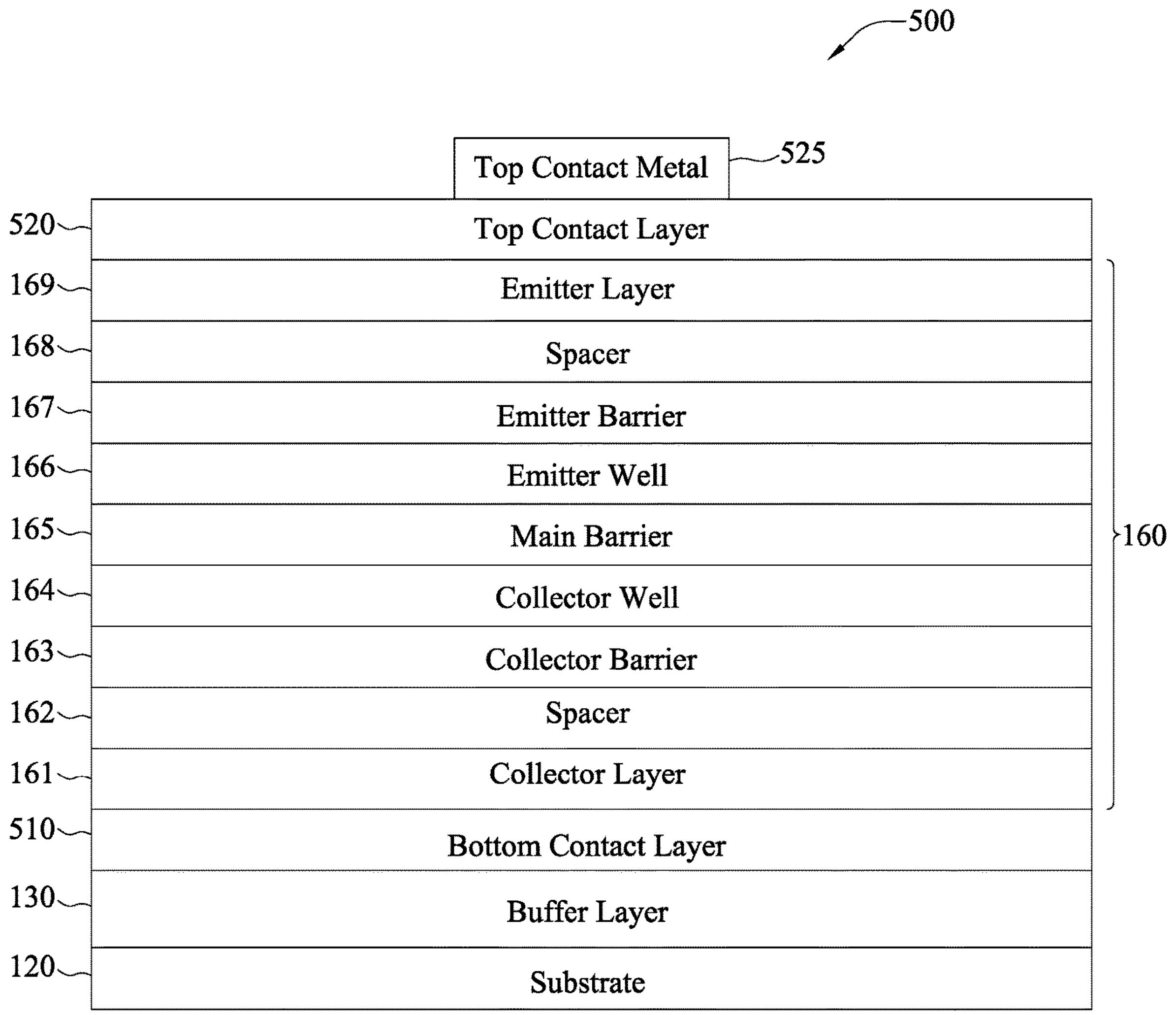
FIGS. 14A-14G are cross-sectional views showing the flow of a method of fabricating a THz transceiver according to an embodiment of the present disclosure.

The crucial process in the overall fabrication of the THz transceiver 500 is the epitaxial growth of the quantum structure. The molecular beam epitaxy (MBE) technique is used to realize the quantum structure of the TBRTD 160. Referring to FIG. 5 or FIG. 14A. At first, a 3-μm thick $In_{0.53}Ga_{0.47}As$ buffer layer 130 is grown on top of the semi-insulating, Fe-doped, InP substrate 120 to achieve perfectly lattice matched growing layers. Next, the bottom contact layer 510, the layers of the TBRTD 160 and the top contact layer 520 are grown from bottom to top. The quality and accuracy of the post-growth layers are verified using high-resolution X-ray diffractometry (HR-XRD) or low-temperature photoluminescence spectroscopy (LT-PT).

The fabrication steps required to realize the THz transceiver 500 are shown in FIGS. 14A-14G. After growing and characterizing the TBRTD 160, the InP wafer will go through a series of fabrication steps. Since the structure of the TBRTD 160 is big enough to use photolithography, all the necessary patterns are done using the MA-6 Aligner tool with the 365 nm UV light source. The first step is to deposit a top contact metal 525 onto the top contact layer 520 using the E-gun evaporation or sputtering tools, as shown in FIG. 14A. The Ti/Pd/Au (with 20/30/150 nm thickness) thin film combination is used as the top contact metal 525 because it provides very low specific contact resistance.

Figure 14B:
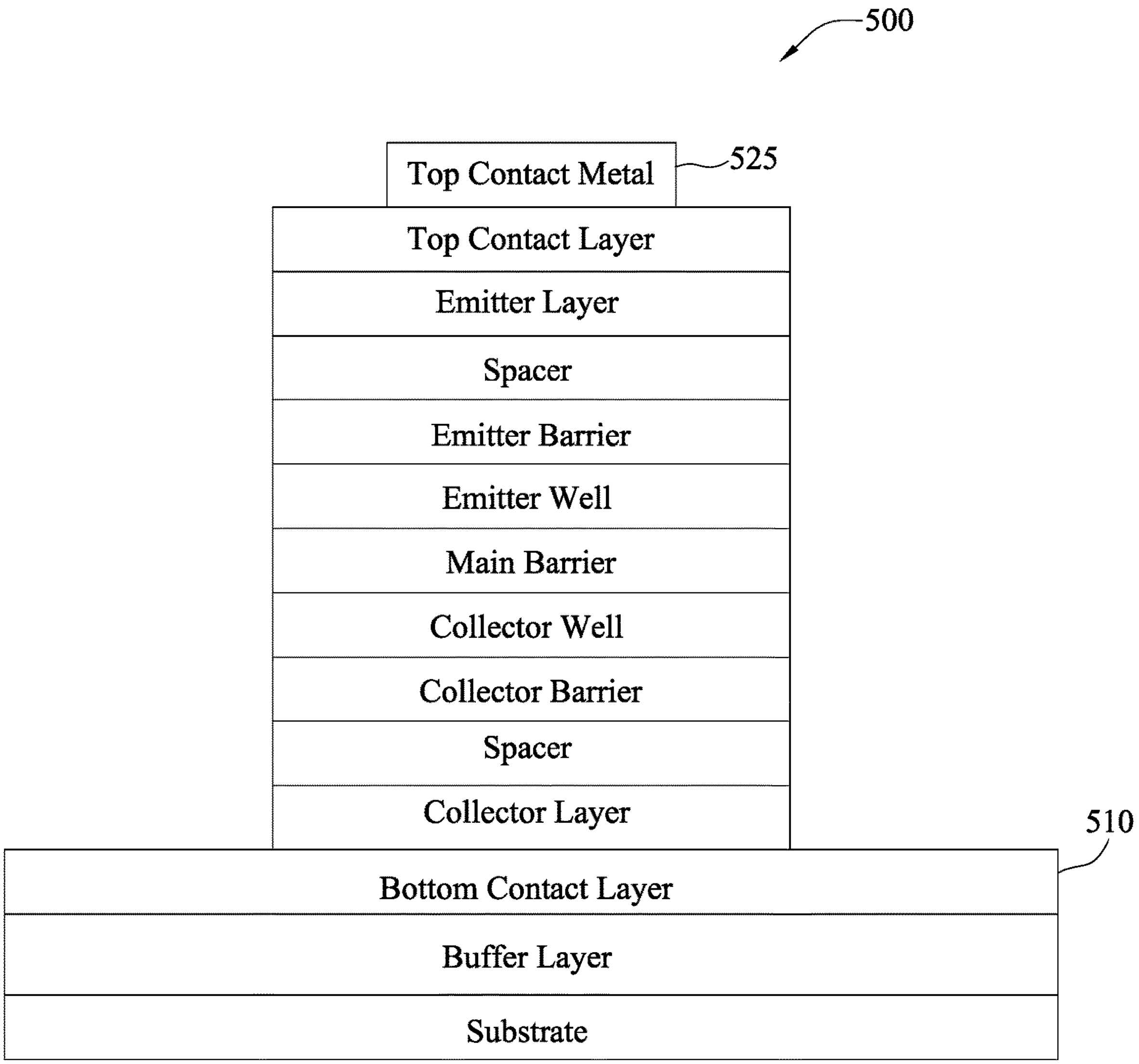
Figure 14C:
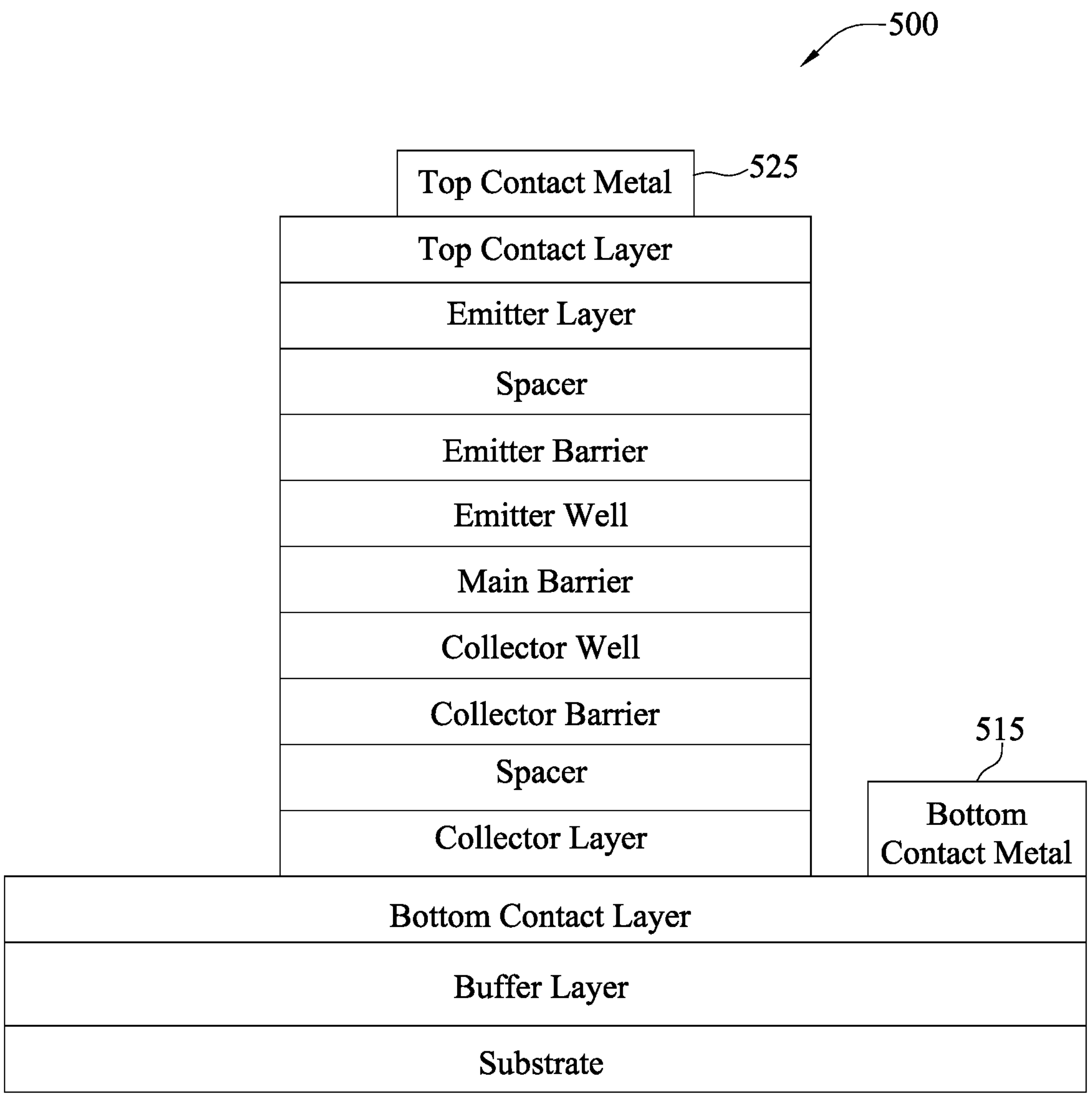
Figure 14D:
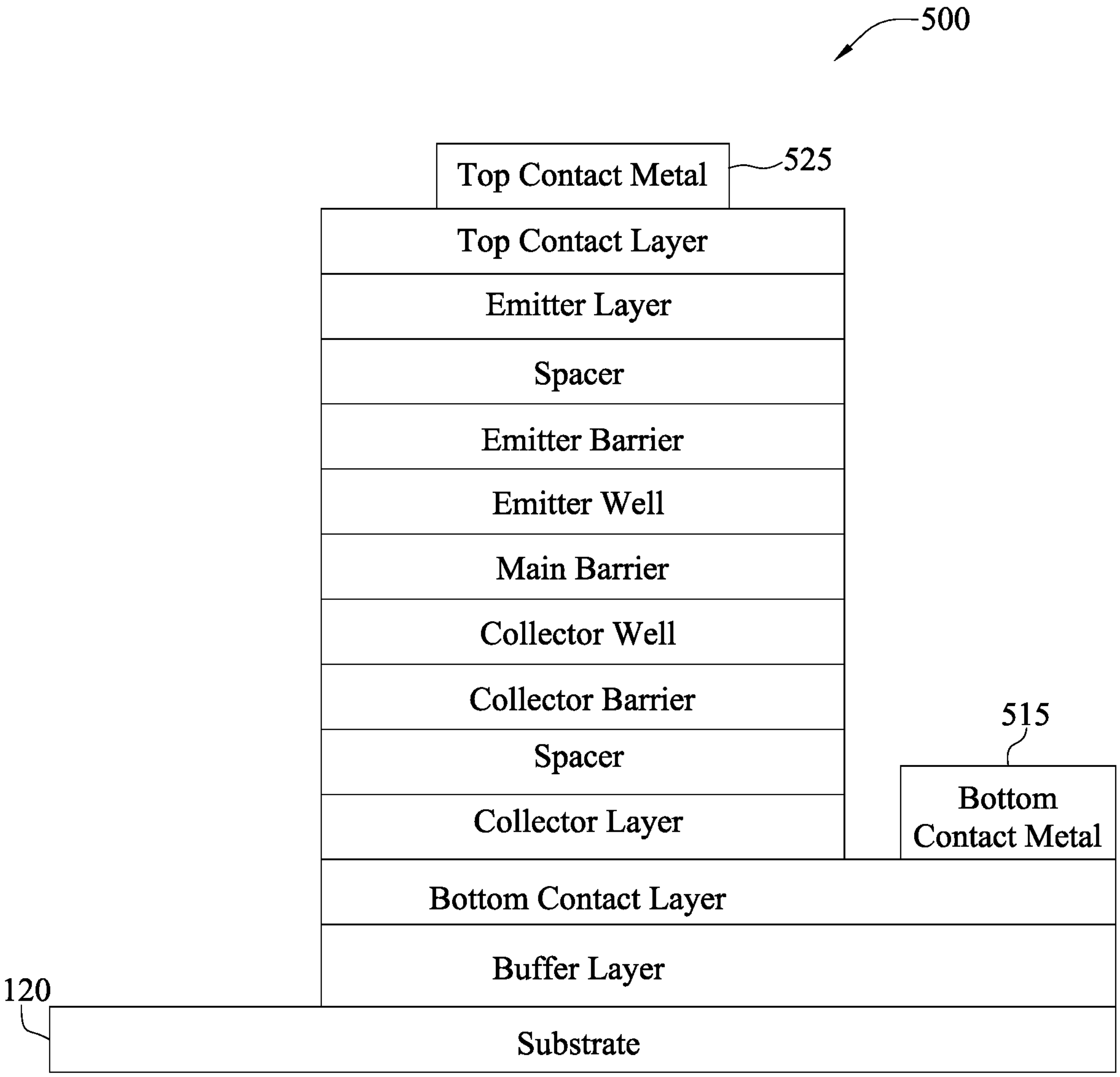

The next step is to deposit the bottom contact metal 515, for which the first mesa etch is performed to etch up to the bottom contact layer 510, as illustrated in FIG. 14B. FIG. 14C shows the bottom contact metal 515 deposited onto the bottom contact layer 510 after the first mesa etching. The Ti/Pd/Au thin film combination is also used as the bottom contact metal 515. The second mesa etching is done to etch up to the InP substrate 120, as depicted in FIG. 14D. The $H_3PO_4$:$H_2O_2$:$H_2O$ (1:1:38) acid solvent mixture is used to complete the two mesa etching steps with an etch rate of approximately 100 nm/min.

Figure 14E:
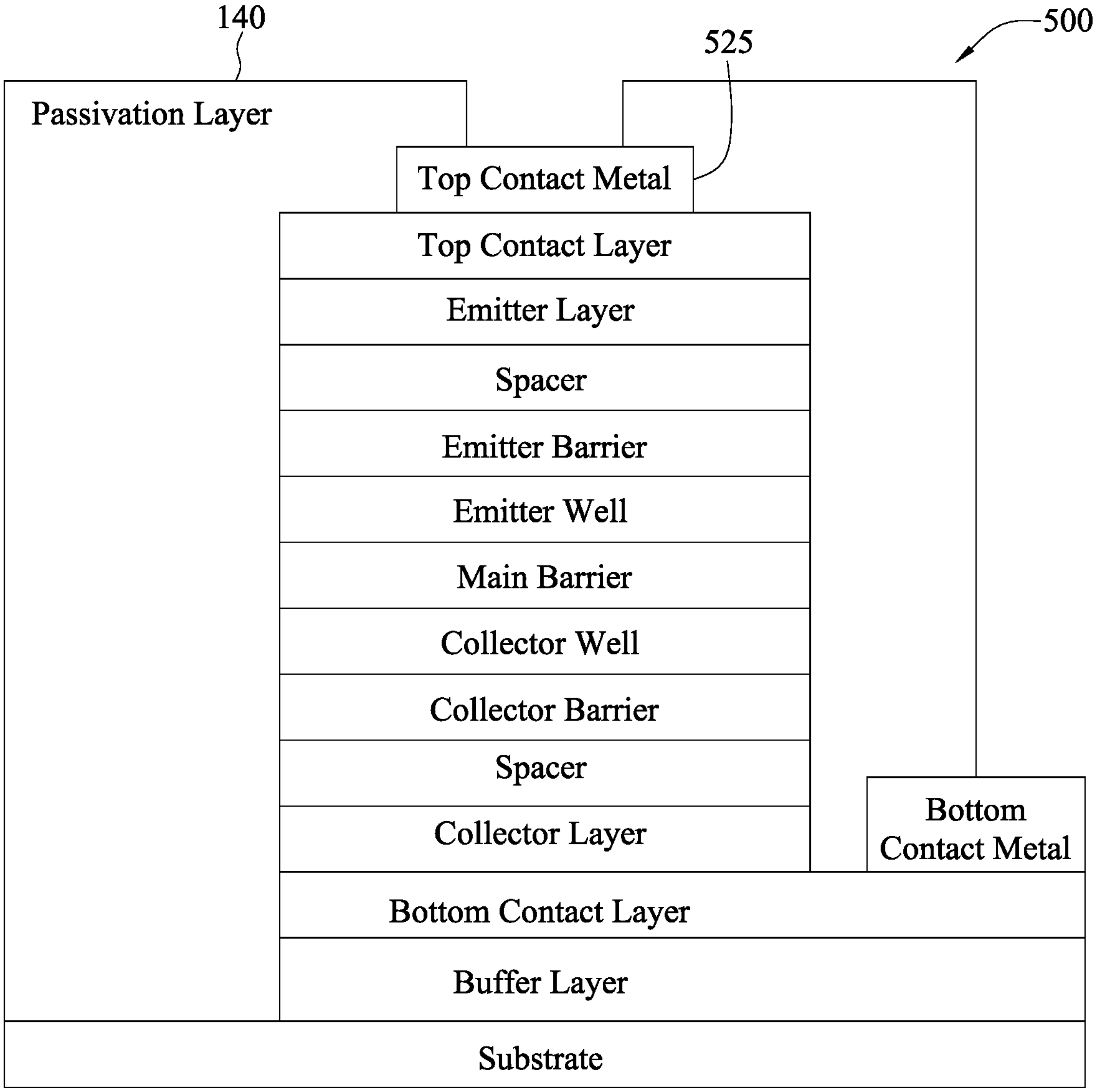
Figure 14F:
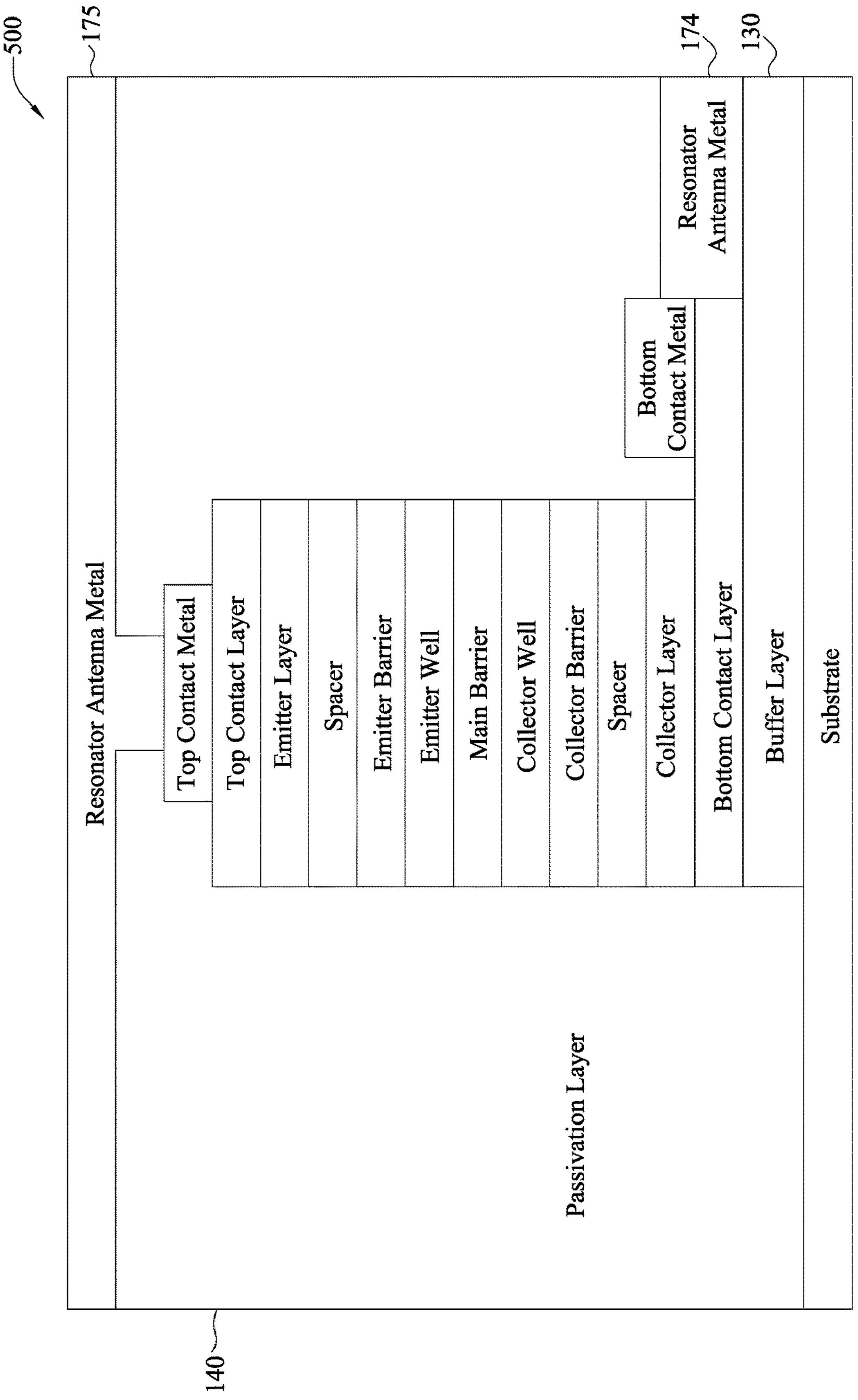

The next step is to spin coat or deposit the passivation layer 140 to protect the quantum structure of the TBRTD 160, as shown in FIG. 14E. The passivation layer 140 may be made of polymer, such as polyimide PI-225, cyclic olefin copolymer (CoC) or benzocyclobutene (BCB). A via for connection with the resonator antenna 170 is opened on the passivation layer 140 to expose the top contact metal 525. After the via-opening, the resonator antenna metal 175 (Ti/Pd/Au) is deposited on top of the passivation layer 140, and the resonator antenna metal 174 (Ti/Pd/Au) is deposited on the buffer layer 130, as illustrated in FIG. 14F. The resonator antenna metals 174 and 175 constitute the resonator antenna 170. The resonator antenna metal 174 is connected to the bottom contact metal 515, while the resonator antenna metal 175 is connected to the top contact metal 525.

Figure 14G:
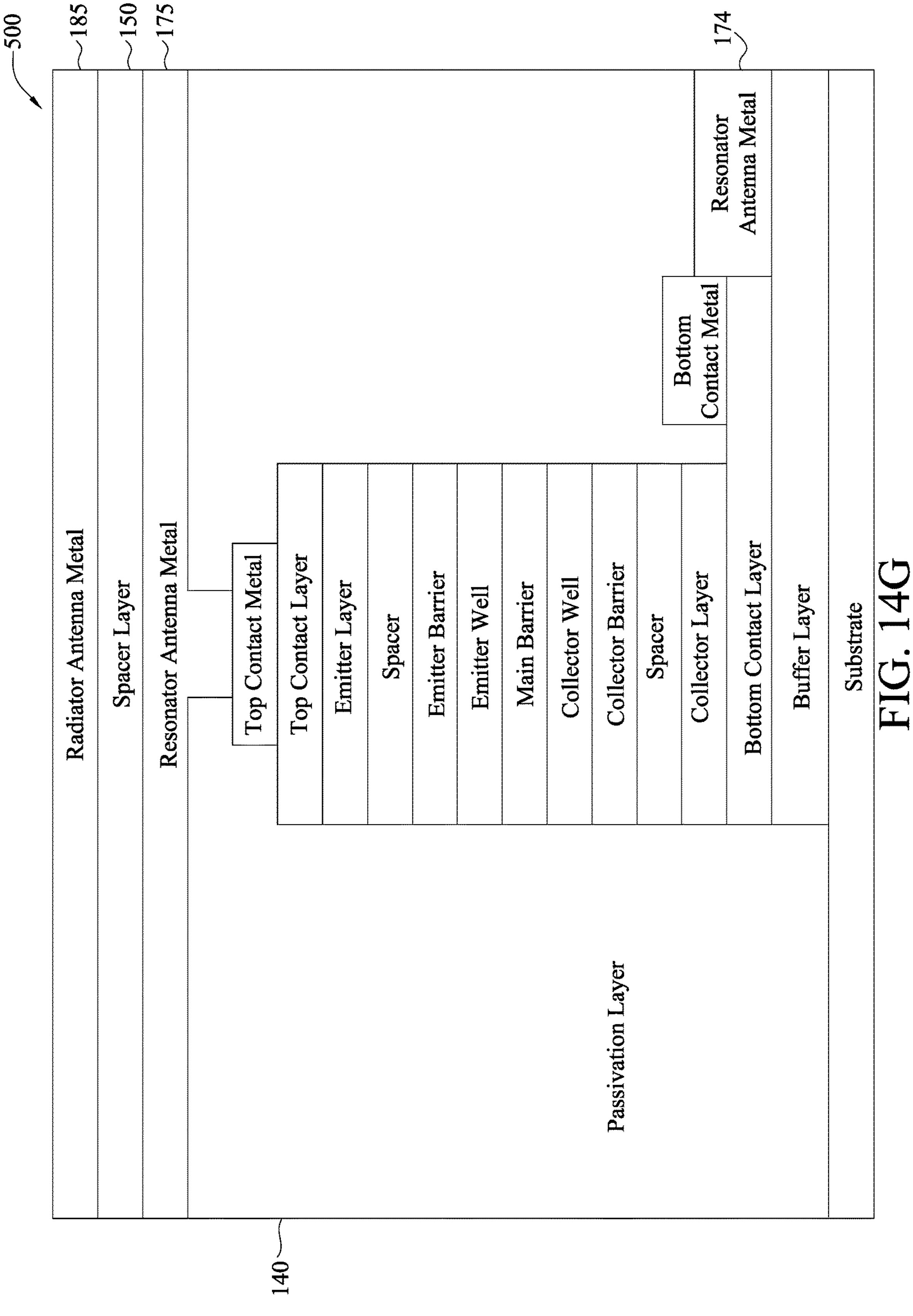

Next, polymer is spin-coated onto the resonator antenna metal 175 to form the spacer layer 150, as shown in FIG. 14G. The thickness of the spacer layer 150 is optimized based on the mutual coupling between the resonator antenna 170 and the radiator antenna 180. Finally, the radiator antenna metal 185 is deposited on the spacer layer 150, as shown in FIG. 14G. The radiator antenna metal 185 constitutes the radiator antenna 180. The thin film technology-based radiator antenna 180 is introduced to maximize the THz radiation in the air side (front side) of the substrate 120.

Figure 15A:
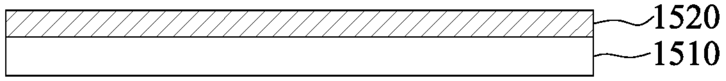
FIGS. 15A-15L are cross-sectional views showing the flow of a method of fabricating a fractal antenna according to an embodiment of the present disclosure.
Figure 15B:
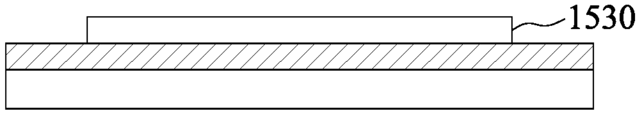
Figure 15C:
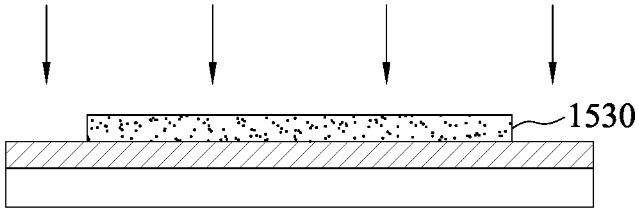

FIGS. 15A-15L are cross-sectional views showing the flow of a method of fabricating a fractal antenna according to an embodiment of the present disclosure. First, a layer of gold 1520 is deposited on a layer of glass 1510, as shown in FIG. 15A, and then a polymer layer 1530 is spin-coated on the gold layer 1520, as shown in FIG. 15B. Next, the polymer layer 1530 is exposed to ultraviolet rays to form liquid crystal droplets in the polymer layer 1530, thus transforming the polymer layer 1530 into a PDLC layer, as shown in FIG. 15C. In the PDLC layer 1530, the polymer is host material and the liquid crystal is active material. The fabrication temperature at this stage should be kept under the polymer's glass transition temperatures to maintain structure morphology.

Figure 15D:
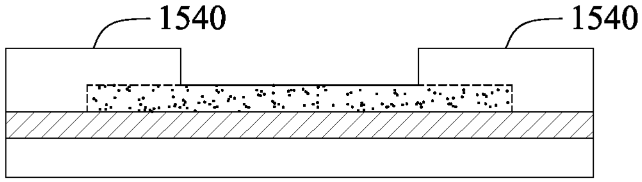
Figure 15E:
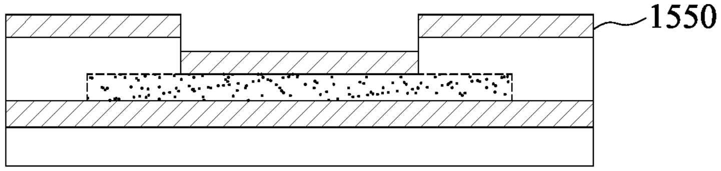
Figure 15F:
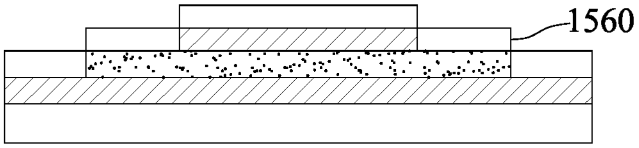

Next, the side regions of the PDLC layer 1530 are covered by tapes 1540, as shown in FIG. 15D, and then another layer of gold 1550 is deposited on the PDLC layer 1530 and the tapes 1540, as shown in FIG. 15E, and then the tapes 1540 and a part of the gold layer 1550 on the tapes 1540 are removed, and then an aluminum layer 1560 is deposited on the gold layer 1520, the PDLC layer 1530 and the remaining part of the gold layer 1550, as shown in FIG. 15F. The metal layers, namely the gold layers 1520, 1550 and the aluminum layer 1560, may be deposited by a low temperature deposition method such as sputtering.

Figure 15G:
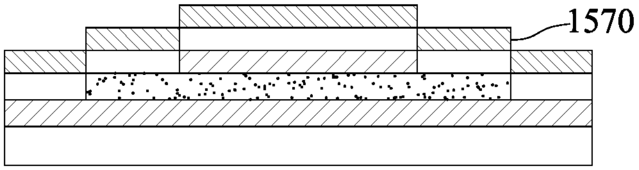
Figure 15H:
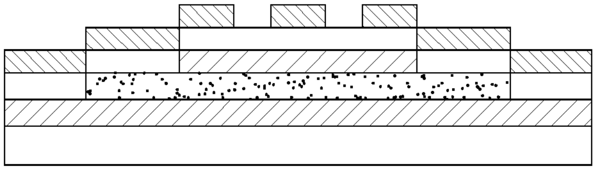
Figure 15I:
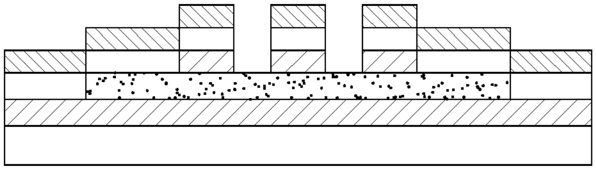

Next, a photoresist layer 1570 is deposited on the aluminum layer 1560, as shown in FIG. 15G, and then a fractal pattern is formed in the photoresist layer 1570 by photolithography, as shown in FIG. 15H, and then the aluminum layer 1560 is etched by an aluminum etchant, and then the gold layer 1550 is etched by a gold etchant, such as trifluoroacetic acid (TFA), thus forming the same fractal pattern in the aluminum layer 1560 and the gold layer 1550, as shown in FIG. 15I.

Figure 15J:
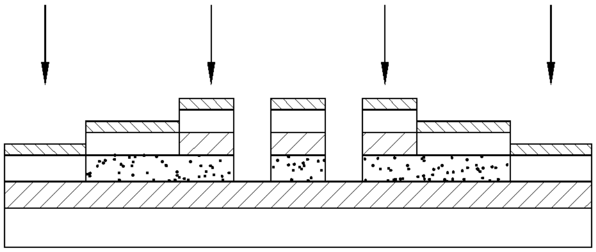
Figure 15K:
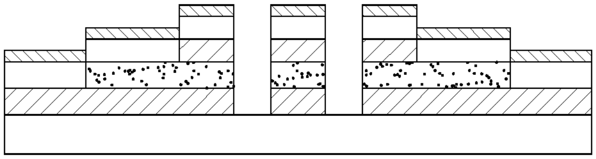
Figure 15L:
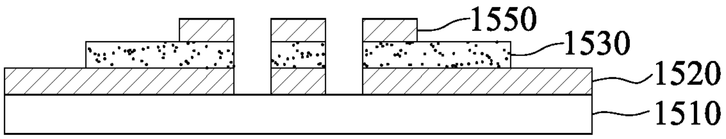

Next, reactive ion etching (ME) is performed by oxygen plasma with carbon tetrafluoride ($CF_4$) and argon (Ar) gas to thin the photoresist layer 1570 and etch the PDLC layer 1530, thus forming the same fractal pattern in the PDLC layer 1530, as shown in FIG. 15J, and then the gold layer 1520 is etched by TFA to form the same fractal pattern in the gold layer 1520, as shown in FIG. 15K. Finally, the photoresist layer 1570 and the aluminum layer 1560 are removed, as shown in FIG. 15L.

In an embodiment, the gold layers 1520 and 1550 constitute the aforementioned resonator antenna 170 and the PDLC layer 1530 is the aforementioned passivation layer 140. The aforementioned radiator antenna 180 may be fabricated in a similar process.

In another embodiment, the gold layer 1520 constitutes the aforementioned resonator antenna 170, the gold layer 1550 constitutes the aforementioned radiator antenna 180, and the PDLC layer 1530 is the aforementioned spacer layer 150.

In yet another embodiment, at least one of the gold layers 1520 and 1550 may be replaced with at least one layer of another kind of electrical conductor.

While some of the embodiments of the present disclosure have been described in detail above, it is, however, possible for those of ordinary skill in the art to make various modifications and changes to the particular embodiments shown without substantially departing from the teaching and advantages of the present disclosure. Such modifications and changes are encompassed in the spirit and scope of the present disclosure as set forth in the appended claims.

The invention claimed is:

1. A terahertz (THz) transceiver, comprising:
- a triple-barrier resonant tunneling diode (TBRTD) with an emitter layer and a collector layer;
- a resonator antenna electrically connected to the emitter layer and the collector layer of the TBRTD;
- a spacer layer disposed on the resonator antenna; and
- a radiator antenna disposed on the spacer layer,
  - wherein the spacer layer separates the resonator antenna and the radiator antenna, and
  - wherein the resonator antenna and the radiator antenna are vertically aligned and inductively coupled.

2. The THz transceiver according to claim 1, wherein:
- in a transmitter operation, the TBRTD generates a first THz current, the resonator antenna creates resonance with the TBRTD based on the first THz current to generate a THz electromagnetic wave, and the THz electromagnetic wave inductively couples with the radiator antenna and is emitted into a free space by the radiator antenna; and
- in a receiver operation, the radiator antenna absorbs an incident THz signal, an electromagnetic field of the incident THz signal at the radiator antenna inductively couples with the resonator antenna, and the electromagnetic field at the resonator antenna causes a second THz current flow through the TBRTD due to electrical rectification.

3. The THz transceiver according to claim 1, wherein the resonator antenna and the radiator antenna are fractal antennas shaped according to a same fractal curve or a same fractal pattern.

4. The THz transceiver according to claim 3, wherein:

at least one of the resonator antenna and the radiator antenna comprises at least one switch embedded in the fractal curve or the fractal pattern of the resonator antenna and/or the radiator antenna; and the at least one switch is configured for connecting and disconnecting parts of the resonator antenna and/or the radiator antenna to shift an operating frequency of the resonator antenna and/or the radiator antenna.

5. The THz transceiver according to claim 1, wherein the TBRTD comprises a collector barrier, a collector well disposed on the collector barrier, a main barrier disposed on the collector well, an emitter well disposed on the main barrier, and an emitter barrier disposed on the emitter well.

6. The THz transceiver according to claim 5, wherein:

the main barrier is made of In0.52Al0.48As;

the collector well and the emitter well are made of In0.53Ga0.47As; and the collector barrier and the emitter barrier are made of AlAs.

7. The THz transceiver according to claim 5, wherein:

a thickness of the emitter well is larger than a thickness of the collector well;

the thickness of the collector well is larger than a thickness of the main barrier;

the collector barrier and the emitter barrier have a same thickness; and the thickness of the main barrier is larger than the same thickness of the collector barrier and the emitter barrier.

8. The THz transceiver according to claim 1, further comprising:

a substrate made of indium phosphide;

a buffer layer made of In0.53Ga0.47As and disposed on the substrate; and a passivation layer made of silicon dioxide or polymer and disposed on the buffer layer, wherein the TBRTD is embedded in the passivation layer, and wherein the spacer layer is made of polymer and disposed on the passivation layer.

9. The THz transceiver according to claim 8, further comprising:

a bottom contact layer made of In0.53Ga0.47As and disposed between the buffer layer and the TBRTD; and a top contact layer made of In0.53Ga0.47As and disposed between the TBRTD and the spacer layer, wherein, a common doping concentration of silicon in the bottom contact layer and the top contact layer is larger than a common doping concentration of silicon in the collector layer and the emitter layer of the TBRTD; and the common doping concentration of silicon in the collector layer and the emitter layer of the TBRTD is larger than a doping concentration of silicon in the buffer layer.

10. The THz transceiver according to claim 8, wherein:

the radiator antenna has a same shape and a same size as those of a main section of the resonator antenna; and the main section of the resonator antenna is disposed on the substrate, the buffer layer or the passivation layer.

11. The THz transceiver according to claim 8, further comprising:

a grating reflector disposed under the substrate and made of interleaved metal and dielectric, wherein a combined width of each adjacent pair of a piece of metal and a piece of dielectric in the grating reflector is smaller than a wavelength of a THz electromagnetic wave generated from the resonator antenna.

12. The THz transceiver according to claim 8, wherein at least one of the substrate, the buffer layer, the passivation layer and the spacer layer comprises a ferroelectric material, and a permittivity of the ferroelectric material changes when an electric field applied to the ferroelectric material changes.

13. A method of fabricating a terahertz (THz) transceiver, comprising:

forming a triple-barrier resonant tunneling diode (TBRTD) with an emitter layer and a collector layer, forming a resonator antenna electrically connected to the emitter layer and the collector layer of the TBRTD;

forming a spacer layer disposed on the resonator antenna; and forming a radiator antenna disposed on the spacer layer, wherein the spacer layer separates the resonator antenna and the radiator antenna, and wherein the resonator antenna and the radiator antenna are vertically aligned and inductively coupled.

14. The method according to claim 13, wherein the resonator antenna and the radiator antenna are fractal antennas shaped according to a same fractal curve or a same fractal pattern.

15. The method according to claim 13, wherein the TBRTD comprises a collector barrier, a collector well disposed on the collector barrier, a main barrier disposed on the collector well, an emitter well disposed on the main barrier, and an emitter barrier disposed on the emitter well.

16. The method according to claim 15, wherein:

the main barrier is made of In0.52Al0.48As;

the collector well and the emitter well are made of In0.53Ga0.47As; and the collector barrier and the emitter barrier are made of AlAs.

17. The method according to claim 15, wherein:

a thickness of the emitter well is larger than a thickness of the collector well;

the thickness of the collector well is larger than a thickness of the main barrier;

the collector barrier and the emitter barrier have a same thickness; and the thickness of the main barrier is larger than the same thickness of the collector barrier and the emitter barrier.

18. The method according to claim 13, further comprising:

forming a grating reflector disposed under the resonator antenna and made of interleaved metal and dielectric, wherein a combined width of each adjacent pair of a piece of metal and a piece of dielectric in the grating reflector is smaller than a wavelength of a THz electromagnetic wave generated from the resonator antenna.

19. The method according to claim 13, further comprising:

providing a ferroelectric material disposed under the resonator antenna or the radiator antenna, wherein a permittivity of the ferroelectric material changes when an electric field applied to the ferroelectric material changes.

20. The method according to claim 13, further comprising:

forming a first conductor layer;

forming a polymer dispersed liquid crystal (PDLC) layer on the first conductor layer;

forming a second conductor layer on the PDLC layer;

forming an aluminum layer on the second conductor layer;

forming a photoresist layer on the aluminum layer;

forming a fractal pattern in the photoresist layer, the aluminum layer, the second conductor layer, the PDLC layer and the first conductor layer by photolithography and etching; and removing the photoresist layer and the aluminum layer, wherein the first conductor layer and the second conductor layer constitute the resonator antenna and/or the radiator antenna.

* * * * *